US012132658B2

(12) United States Patent
Kolbe et al.

(10) Patent No.: US 12,132,658 B2
(45) Date of Patent: Oct. 29, 2024

(54) OPERATION OF A BROADBAND ACCESS NETWORK OF A TELECOMMUNICATIONS NETWORK COMPRISING A CENTRAL OFFICE POINT OF DELIVERY

(71) Applicant: Deutsche Telekom AG, Bonn (DE)

(72) Inventors: Hans-Joerg Kolbe, Darmstadt (DE); Thomas Haag, Rodgau (DE); Manuel Paul, Berlin (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 17/393,421

(22) Filed: Aug. 4, 2021

(65) Prior Publication Data

US 2022/0052953 A1 Feb. 17, 2022

(30) Foreign Application Priority Data

Aug. 11, 2020 (EP) .................................. 20 190 484

(51) Int. Cl.
*H04L 47/125* (2022.01)
*H04L 41/0816* (2022.01)

(52) U.S. Cl.
CPC ........ *H04L 47/125* (2013.01); *H04L 41/0816* (2013.01)

(58) Field of Classification Search
CPC ............... H04L 47/125; H04L 41/0816; H04L 67/1001; H04L 12/2801; H04L 12/66;
(Continued)

(56) References Cited

U.S. PATENT DOCUMENTS 8,179,809 B1 * 5/2012 Eppstein ............. H04L 67/1001
370/254
10,623,822 B2 * 4/2020 Shen .................. H04N 21/6118
(Continued)

FOREIGN PATENT DOCUMENTS

EP 3082300 A1 10/2016
EP 3672169 A1 6/2020

OTHER PUBLICATIONS

Luis Velasco, et al., "A Service-Oriented Hybrid Access Network and Clouds Architecture", IEEE Communications Magazine, Apr. 2015, pp. 159-165, IEEE, New York, USA.

*Primary Examiner* — Greg C Bengzon
(74) *Attorney, Agent, or Firm* — LEYDIG, VOIT & MAYER, LTD.

(57) ABSTRACT

A method for operation of a broadband access network of a telecommunications network includes: a central office point of delivery and/or a load management entity or functionality thereof detects that an increased load situation is currently happening or determines that an increased load situation is likely to happen or that a specific task is to be performed; the central office point of delivery triggers the use of additional virtualized network functions and/or additional micro services and an additional message router and load balancing entity for handling the increased load situation and/or for performing specific tasks within the telecommunications network and/or within the central office point of delivery; and upon detection of a normal load situation, the central office point of delivery releases the use of the additional virtualized network functions and/or additional micro services and the use of the additional message router and load balancing entity.

8 Claims, 2 Drawing Sheets

(58) Field of Classification Search
CPC .............. H04L 41/0663; H04L 41/0668; H04L 41/0806; H04L 41/0893; H04L 41/0895; H04L 41/0897; H04L 43/10; H04L 43/12; H04L 43/16; H04L 45/02; H04L 47/50; H04L 49/25; H04L 61/5007; H04L 67/02; H04L 67/1014; H04L 67/1031; H04L 67/1097; H04L 67/56; H04L 67/60; H04L 67/10; H04N 21/6118; H04N 21/615; H04N 21/6338; H04N 21/64707; G06F 9/45558; G06F 11/1438; G06F 11/203; G06F 11/2041; G06F 2009/4557; G06F 9/5077; G06F 11/0712; G06F 11/0736; G06F 11/0739; G06F 11/0751; G06F 11/0793; G06F 11/1402; G06F 11/20; G06F 11/2007; G06F 11/2025; G06F 11/2028; G06F 11/2048; G06F 11/3409; G06F 16/2453; G06F 16/2455; G06F 16/24553; G06F 16/25; G06F 16/283; G06F 16/285; G06F 2009/45575; G06F 2009/45583; G06F 2009/45595; G06F 2201/815; G06F 2201/82; G06F 2209/5014; G06F 2209/5021; G06F 2212/202; G06F 2212/205; G06F 3/0679; G06F 9/4418; G06F 9/44521; G06F 9/455; G06F 9/45533; G06F 9/4856; G06F 9/4881; G06F 9/505; G06F 9/5072; G06F 9/5088; G06F 9/54

See application file for complete search history.

(56) References Cited

U.S. PATENT DOCUMENTS

| | | | | |
|---|---|---|---|---|
| 10,693,713 | B1* | 6/2020 | Yang | H04W 24/02 |
| 10,812,366 | B1* | 10/2020 | Berenberg | H04L 41/0895 |
| 11,388,108 | B1* | 7/2022 | Rothschild | H04L 67/60 |
| 2005/0005200 | A1* | 1/2005 | Matena | G06F 11/1482 |
| | | | | 714/38.13 |
| 2010/0157824 | A1* | 6/2010 | Thompson | H04L 43/0829 |
| | | | | 370/252 |
| 2010/0166058 | A1* | 7/2010 | Perlman | H04N 19/146 |
| | | | | 375/E7.126 |
| 2011/0276695 | A1* | 11/2011 | Maldaner | G06F 9/5083 |
| | | | | 709/226 |
| 2012/0226797 | A1* | 9/2012 | Ghosh | H04L 67/1008 |
| | | | | 709/224 |
| 2012/0282929 | A1* | 11/2012 | Persson | H04W 36/0033 |
| | | | | 455/436 |
| 2013/0004179 | A1* | 1/2013 | Nielsen | H04N 17/00 |
| | | | | 398/115 |
| 2013/0124712 | A1* | 5/2013 | Parker | H04L 43/55 |
| | | | | 709/224 |
| 2013/0151681 | A1* | 6/2013 | Dournov | G06F 8/656 |
| | | | | 718/103 |
| 2014/0149784 | A1* | 5/2014 | Ngo | H04L 67/1008 |
| | | | | 714/4.11 |
| 2015/0263894 | A1* | 9/2015 | Kasturi | H04L 41/0897 |
| | | | | 709/222 |
| 2016/0112252 | A1* | 4/2016 | Notari | H04L 41/0843 |
| | | | | 709/221 |
| 2017/0199770 | A1* | 7/2017 | Peteva | G06F 9/5088 |
| 2017/0339065 | A1* | 11/2017 | Li | H04L 41/0895 |
| 2017/0366983 | A1* | 12/2017 | Gunasekara | H04L 43/0811 |
| 2018/0027080 | A1* | 1/2018 | Yang | H04L 67/51 |
| | | | | 709/224 |
| 2018/0041440 | A1* | 2/2018 | Goemaere | H04W 88/16 |
| 2018/0060102 | A1* | 3/2018 | Zhu | G06F 9/45533 |
| 2019/0124407 | A1* | 4/2019 | Shen | H04N 21/6118 |
| 2019/0286475 | A1* | 9/2019 | Mani | G06F 9/45558 |
| 2019/0327312 | A1* | 10/2019 | Gupta | H04L 67/148 |
| 2019/0394658 | A1* | 12/2019 | Baillargeon | H04L 41/0895 |
| 2020/0022005 | A1* | 1/2020 | Campos | H04L 41/40 |
| 2020/0034258 | A1* | 1/2020 | Avraham | G06F 11/2094 |
| 2020/0036578 | A1* | 1/2020 | Gupta | H04L 43/12 |
| 2020/0050694 | A1* | 2/2020 | Avalani | G06F 16/2455 |
| 2020/0153898 | A1* | 5/2020 | Sabath | G06F 9/4856 |
| 2020/0160682 | A1* | 5/2020 | Johnson | G06V 40/10 |
| 2020/0327006 | A1* | 10/2020 | Khanna | G06F 11/1438 |
| 2020/0328977 | A1* | 10/2020 | Pfister | H04L 67/5681 |
| 2020/0356397 | A1* | 11/2020 | Kumatagi | H04L 47/22 |
| 2021/0014128 | A1* | 1/2021 | Mereddy | H04L 41/0853 |
| 2021/0019160 | A1* | 1/2021 | Pan | G06F 9/5072 |
| 2021/0026661 | A1* | 1/2021 | Sulcer | H04L 41/5012 |
| 2021/0176327 | A1* | 6/2021 | Soliman | H04M 15/64 |

* cited by examiner

OPERATION OF A BROADBAND ACCESS NETWORK OF A TELECOMMUNICATIONS NETWORK COMPRISING A CENTRAL OFFICE POINT OF DELIVERY

CROSS-REFERENCE TO PRIOR APPLICATIONS

This application claims benefit to European Patent Application No. EP 20 190 484.4, filed on Aug. 11, 2020, which is hereby incorporated by reference herein.

FIELD

The present invention relates to a method for an operation of a broadband access network of a telecommunications network comprising a central office point of delivery and/or for handling increased load situations and/or for performing specific tasks within the telecommunications network and/or within the central office point of delivery, wherein the central office point of delivery and/or the broadband access network comprises a plurality of compute nodes or servers being internally connected and providing an infrastructure to realize, on the one hand, a plurality of virtualized network functions and/or micro services, and, on the other hand, a message router and load balancing entity connecting these virtualized network functions and/or micro services.

Furthermore, the present invention relates to a broadband access network or telecommunications network for an operation of a broadband access network of a telecommunications network comprising a central office point of delivery and/or for handling increased load situations and/or for performing specific tasks within the telecommunications network and/or within the central office point of delivery, wherein the central office point of delivery and/or the broadband access network comprises a plurality of compute nodes or servers being internally connected and providing an infrastructure to realize, on the one hand, a plurality of virtualized network functions and/or micro services, and, on the other hand, a message router and load balancing entity connecting these virtualized network functions and/or micro services.

Additionally, the present invention relates to a central office point of delivery or a system comprising a central office point of delivery an operation of a broadband access network of a telecommunications network comprising a central office point of delivery and/or for handling increased load situations and/or for performing specific tasks within the telecommunications network and/or within the central office point of delivery, wherein the central office point of delivery and/or the broadband access network comprises a plurality of compute nodes or servers being internally connected and providing an infrastructure to realize, on the one hand, a plurality of virtualized network functions and/or micro services, and, on the other hand, a message router and load balancing entity connecting these virtualized network functions and/or micro services.

Furthermore, the present invention relates to a program and a computer-readable medium for an operation of a broadband access network of a telecommunications network comprising a central office point of delivery and/or for handling increased load situations and/or for performing specific tasks within the telecommunications network and/or within the central office point of delivery.

BACKGROUND

The exchange of packetized information in broadband communication systems or telecommunications networks, both in fixed-line as in wireless communication systems (or fixed-line communication networks and mobile communication networks) has already grown dramatically and probably will also grow in the future due to the rapid spread of different data services in such communication networks.

In conventionally known or current central office point of delivery design architectures, especially of the kind having or comprising modular software and hardware elements or entities that replaces dedicated (physical) network elements, situations might arise where typical operational parameters or indicators, such as, e.g., the time for setting up a subscriber line or a user session, deteriorate due to increased load situations and/or due to specific tasks being performed within the central office point of delivery, such as, e.g., partial or full system reboots.

SUMMARY

In an exemplary embodiment, the present invention provides a method for operation of a broadband access network of a telecommunications network comprising a central office point of delivery and/or for handling increased load situations and/or for performing specific tasks within the telecommunications network and/or within the central office point of delivery. The central office point of delivery has or realizes a plurality of access nodes that terminate physical subscriber lines serving end users of the telecommunications network. The handling of increased load situations and/or the performance of specific tasks relate to carrier control plane functions performed or to be performed by the central office point of delivery. The central office point of delivery and/or the broadband access network comprises a plurality of compute nodes or servers being internally connected and providing an infrastructure to realize, on the one hand, a plurality of virtualized network functions and/or micro services, and, on the other hand, a message router and load balancing entity connecting the plurality of virtualized network functions and/or micro services. The central office point of delivery is furthermore connected or connectable to additional compute nodes configured to provide an infrastructure to realize additional virtualized network functions and/or additional micro services and an additional message router and load balancing entity over a tunnel connection. The central office point of delivery comprises a load management entity or functionality, wherein in order for operating the central office point of delivery and/or for handling increased load situations and/or for performing specific tasks within the telecommunications network and/or within the central office point of delivery, the method comprises the following steps: in a first step, the central office point of delivery and/or the load management entity or functionality thereof detects that an increased load situation is currently happening or determines that an increased load situation is likely to happen or that a specific task is to be performed; in a second step, the central office point of delivery triggers the use of the additional virtualized network functions and/or additional micro services and the additional message router and load balancing entity for handling the increased load situation and/or for performing specific tasks within the telecommunications network and/or within the central office point of delivery; and in a third step, upon detection of a normal load situation, the central office point of delivery releases the use of the additional virtualized network functions and/or additional micro services and the use of the additional message router and load balancing entity.

BRIEF DESCRIPTION OF THE DRAWINGS

Subject matter of the present disclosure will be described in even greater detail below based on the exemplary figures.

All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
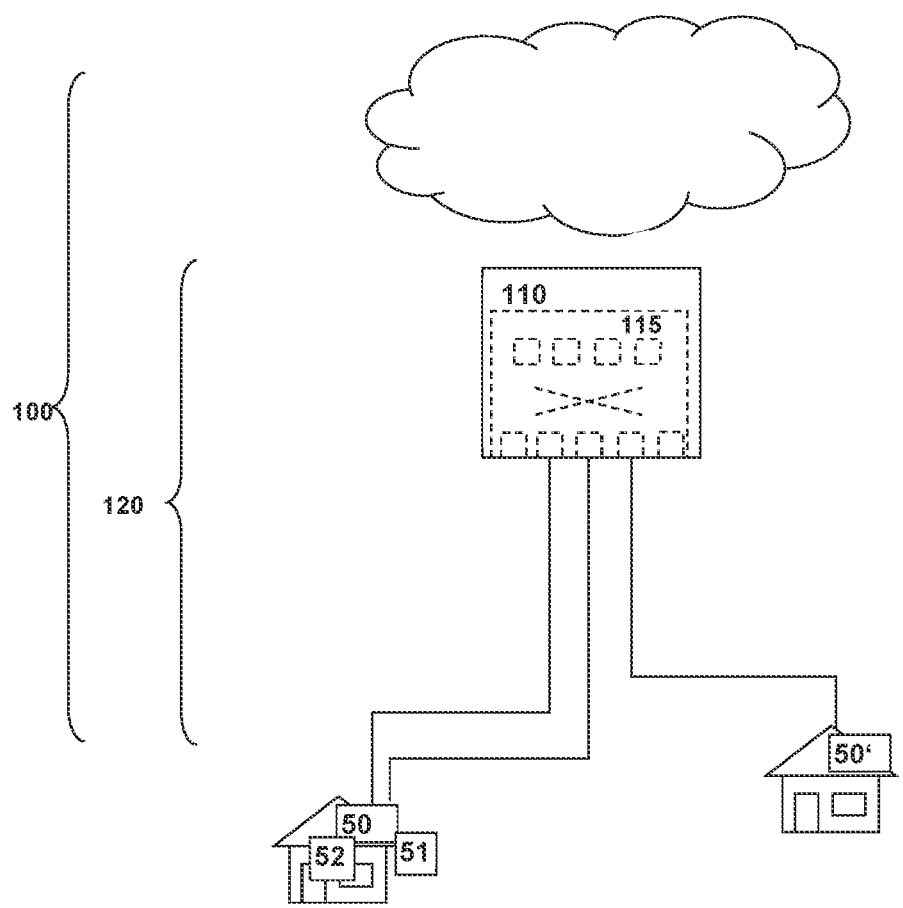
FIG. 1 schematically illustrates a telecommunications network according to the present invention, having a broadband access network with a central office point of delivery.

Exemplary embodiments of the present invention provide a technically simple, effective and cost effective solution for an operation of a broadband access network of a telecommunications network, comprising a central office point of delivery, and/or for handling increased load situations and/or for performing specific tasks within the telecommunications network and/or within the central office point of delivery, wherein the handling of increased load situations and/or the performance of specific tasks relate to carrier control plane functions performed or to be performed by the central office point of delivery, wherein the central office point of delivery and/or the broadband access network comprises a plurality of compute nodes or servers being internally connected and providing an infrastructure to realize, on the one hand, a plurality of virtualized network functions and/or micro services, and, on the other hand, a message router and load balancing entity connecting these virtualized network functions and/or micro services. Exemplary embodiments of the present invention further provide a corresponding broadband access network or telecommunications network, a corresponding central office point of delivery and a corresponding system according to the present invention.

In an exemplary embodiment, the present invention provides a method for an operation of a broadband access network of a telecommunications network comprising a central office point of delivery and/or for handling increased load situations and/or for performing specific tasks within the telecommunications network and/or within the central office point of delivery, wherein the central office point of delivery has or realizes a plurality of access nodes that terminate physical subscriber lines serving end users of the telecommunications network, wherein the handling of increased load situations and/or the performance of specific tasks relate to carrier control plane functions performed or to be performed by the central office point of delivery, wherein the central office point of delivery and/or the broadband access network comprises a plurality of compute nodes or servers being internally connected and providing an infrastructure to realize, on the one hand, a plurality of virtualized network functions and/or micro services, and, on the other hand, a message router and load balancing entity connecting these virtualized network functions and/or micro services, wherein the central office point of delivery is furthermore connected or connectable to additional compute nodes being able to provide an infrastructure to realize additional virtualized network functions and/or additional micro services and an additional message router and load balancing entity over a tunnel connection, wherein the central office point of delivery comprises a load management entity or functionality, wherein in order for operating the central office point of delivery and/or for handling increased load situations and/or for performing specific tasks within the telecommunications network and/or within the central office point of delivery, the method comprises the following steps:

in a first step, the central office point of delivery and/or the load management entity or functionality thereof
detects that an increased load situation is currently happening, or
expects that an increased load situation is likely to happen or that a specific task is to be performed, in a second step, the central office point of delivery triggers the use of the additional virtualized network functions and/or additional micro services and the additional message router and load balancing entity for handling the actual or expected increased load situation and/or for performing specific tasks within the telecommunications network and/or within the central office point of delivery, in a third step, upon a detection of a normal load situation, the central office point of delivery releases the use of the additional virtualized network functions and/or additional micro services and the use of the additional message router and load balancing entity.

It is thereby advantageously possible according to the present invention to provide a solution to extend the locally available compute power, within the central office point of delivery, via the additional virtualized network functions and/or additional micro services and the additional message router and load balancing entity. This extension of the locally available computing power is especially possible to provide temporarily, i.e. via extending the compute power inside the central office point of delivery by linking it to external resources for a limited amount of time.

Typically (and for a considered central office point of delivery being set up and operationally running), the bring-up (time) or the change of a single user session (i.e. to provide network connectivity to a user equipment or client device connected, via the central office point of delivery, to the telecommunications network) typically just takes seconds, and maintaining lots of sessions operational does not put a large burden on the control and management plane of the central office point of delivery. However, a problem may arise when many sessions need to be set up at the same time. This can happen, e.g., during partial or full system reboots. In that case, the available processing power and memory of the local compute servers within the central office point of delivery determine the time it takes to bring a large number of customers (i.e. user equipments) into service. Such a setup for a large number of customers might take a considerably longer time, sometimes up to or more than 30 minutes. According to the present invention, it is advantageously possible to reduce this downtime (or this time to service) for user equipments or subscribers served by the specific considered central office point of delivery.

According to the present invention, especially an architecture of a central office point of delivery is used where (along the lines of the Open Networking Foundation (ONF) SEBA architecture) dedicated network elements are replaced by a modular software and hardware structures; hence, disaggregation (i.e. modularization) is a key aspect. The architecture is very similar to a spine-leaf switching architecture and consists of (or comprises) access nodes (terminating physical subscriber lines), switches (transporting, aggregating, shaping subscriber traffic) and servers (hosting the modularized software components that support local management plane and control plane functions for device discovery, subscriber session setup, and maintenance). Such a mini data center system is considered to be a central office point of delivery according to the present invention. When customers attach their customer premises equipments to the telecommunications network over the physical line to the access node (AN) (via or triggering a device attach message), processes inside the control plane implemented by the software framework are triggered (such as access line autoconfig or the like). In subsequent steps, a data path through the switching fabric (of the central office point of delivery) is established (via a path provisioning step). Once that is done, the IP session (cf. Broadband Forum TR-146, TR-187) is being set up.

The process at all these last three stages in the control plane (i.e. software part) involves: (1) receive a packet (request), (2) process the request (especially by looking up data in databases, possibly also by issuing requests to other modules, processing the request, and passing on the request to the next processing stage (which can also be the sender of the request)). According to the present invention, this functional architecture is implemented in a microservice framework supported by a method to registering the service instances and exchange messages among the instances (e.g. via a message bus systems as Apache Kafka).

The first event at each stage triggers the communication between micro services in the central office point of delivery. Those also contact external backend systems. Each stage contains multiple processing steps/message exchanges among such microservice instances as well as between the control and management plane micro services and the physical network devices (incl. the customer premises equipment/optical fiber network terminal devices). Once the internet protocol session is up, the main task of the micro services is to support session maintenance (incl. monitoring and operations, administration and maintenance (OAM)) as well to change their characteristics (e.g. via applying policies) on demand during runtime. The time it takes for completing the full setup procedure is determined by the complexity (processing time for each steps as well as the number of steps) and the capacity of the compute servers within the considered central office point of delivery (i.e. the capacity of the respective micro services). While the complexity of the procedure is optimized, the end-to-end processing time to get a customer in-service is determined by the available compute power (as well as storage capacity) in the central office point of delivery.

According to the present invention, in order to be able for the central office point of delivery to handle increased load situations and/or to perform specific tasks within the telecommunications network, additional virtualized network functions and/or additional micro services and an additional message router and load balancing entity is (especially temporarily) made available to the central office point of delivery over the tunnel connection.

The telecommunications network according to the present invention may be a fixed-line telecommunications network or a mobile communication network but could also have both aspects, i.e. parts of a fixed-line telecommunications network (or being a fixed-line telecommunications network in such parts) and parts of a mobile communication network (or being a mobile communication network in such parts); such networks are also known under the term fixed-mobile-convergence networks (FMC networks).

According to the present invention, it is advantageously possible and preferred according to the present invention that the second step comprises the central office point of delivery, especially the load management entity or functionality,
- to identify and to reserve and/or to request the additional virtualized network functions and/or additional micro services and the additional message router and load balancing entity,
- to use the additional virtualized network functions and/or additional micro services, and/or the additional message router and load balancing entity, especially via either
  - extending the available plurality of virtualized network functions and/or micro services by the additional virtualized network functions and/or additional micro services and/or extending the message router and load balancing entity by the additional message router and load balancing entity, or by
  - relocalizing the plurality of virtualized network functions and/or micro services to the additional virtualized network functions and/or additional micro services,
- to detect the increased load situation to be over and/or to detect the completion of the specific task, and to release the use of the additional virtualized network functions and/or the additional micro services and of the additional message router and load balancing entity for the purposes of the central office point of delivery.

It is thereby advantageously possible according to this preferred embodiment of the present invention to implement and execute, in a controlled manner, using—at least, but typically also only, temporarily—the additional virtualized network functions and/or additional micro services, and/or the additional message router and load balancing entity to either extend or to relocalize the available plurality of virtualized network functions and/or micro services by the additional virtualized network functions and/or additional micro services and/or extending the message router and load balancing entity by the additional message router and load balancing entity
- to detect the increased load situation to be over and/or to detect the completion of the specific task, and to release the use of the additional virtualized network functions and/or the additional micro services and of the additional message router and load balancing entity for the purposes of the central office point of delivery.

Thereby, it is—at least temporarily, but preferably only temporarily—possible to provide, to the central office point of delivery, an enhanced processing capacity in order to handle increased load situations and/or to perform specific tasks.

According to a further preferred embodiment of the present invention,—in case of a failure or in case of problems, especially during the second step—the central office point of delivery, especially the load management entity or functionality, triggers an emergency stop of at least the plurality of virtualized network functions and/or micro services and/or the message router and load balancing entity, the emergency stop especially also involving shutting down the plurality of compute nodes or servers of the central office point of delivery, and triggers a local reboot of at least the plurality of virtualized network functions and/or micro services and/or of the message router and load balancing entity and/or of the plurality of compute nodes or servers of the central office point of delivery.

Thereby, it is advantageously possible to efficiently implement a method according to the present invention.

According to a further embodiment of the present invention, the central office point of delivery comprises a micro services management system to measure the load of the virtualized network functions and/or micro services in real-time.

Thereby, it is advantageously possible to easily and efficiently implement the use of virtualized network functions and/or micro services within the central office point of delivery according to the present invention.

Furthermore, according to a preferred embodiment of the present invention, the central office point of delivery and/or the broadband access network comprises a switching fabric, the switching fabric comprising a plurality of spine network nodes and a plurality of leaf network nodes, and/or wherein the central office point of delivery and/or the broadband access network comprises a plurality of line termination nodes, wherein each one of the plurality of line termination nodes is connected to at least two leaf network nodes of the plurality of leaf network nodes.

Thereby, it is advantageously possible to efficiently implement a method according to the present invention.

According to a further embodiment of the present invention, increased load situations and/or performing specific tasks within the telecommunications network and/or the central office point of delivery include one or a plurality of the following:

complete reboot of the central office point of delivery,
partial reboot of the central office point of delivery, especially a reboot of a line termination node and/or a reboot of a leaf network node,
scheduled maintenance of the compute nodes or servers of the central office point of delivery,
an update, especially a scheduled update of all or at least a majority of user sessions currently running within the central office point of delivery,
running a data processing task or special operative mode, especially a local data processing task or local special operative mode, in the central office point of delivery, especially in the control plane of the central office point of delivery, especially a debugging mode,
relocalizing the control plane of the central office point of delivery to realize the functionality of the central office point of delivery by the additional virtualized network functions and/or additional micro services and/or by the additional message router and load balancing entity.

Via being able, according to the present invention, to efficiently handle increased load situations and/or to efficiently perform specific tasks regarding a multitude of different situations and scenarios, it is advantageously possible according to the present invention to realize the different central office points of delivery in a manner providing less hardware and/or software resources such that the functionality of central office point of delivery is able to be provide in a more cost-effective manner.

Furthermore, the present invention relates to a broadband access network or telecommunications network for an operation of a broadband access network of a telecommunications network comprising a central office point of delivery and/or for handling increased load situations and/or for performing specific tasks within the telecommunications network and/or within the central office point of delivery, wherein the central office point of delivery has or realizes a plurality of access nodes that terminate physical subscriber lines serving end users of the telecommunications network, wherein the handling of increased load situations and/or the performance of specific tasks relate to carrier control plane functions performed or to be performed by the central office point of delivery, wherein the central office point of delivery and/or the broadband access network comprises a plurality of compute nodes or servers being internally connected and providing an infrastructure to realize, on the one hand, a plurality of virtualized network functions and/or micro services, and, on the other hand, a message router and load balancing entity connecting these virtualized network functions and/or micro services, wherein the central office point of delivery is furthermore connected or connectable to additional compute nodes being able to provide an infrastructure to realize additional virtualized network functions and/or additional micro services and an additional message router and load balancing entity over a tunnel connection, wherein the central office point of delivery comprises a load management entity or functionality, wherein in order for operating the central office point of delivery and/or for handling increased load situations and/or for performing specific tasks within the telecommunications network and/or within the central office point of delivery, the broadband access network or telecommunications network is configured such that:

the central office point of delivery and/or the load management entity or functionality thereof
detects that an increased load situation is currently happening, or
expects that an increased load situation is likely to happen or that a specific task is to be performed,
the central office point of delivery triggers the use of the additional virtualized network functions and/or additional micro services and the additional message router and load balancing entity for handling the actual or expected increased load situation and/or for performing specific tasks within the telecommunications network and/or within the central office point of delivery,
upon a detection of a normal load situation, the central office point of delivery releases the use of the additional virtualized network functions and/or additional micro services and the use of the additional message router and load balancing entity.

Additionally, the present invention relates to a central office point of delivery and/or system comprising a central office point of delivery for an operation of a broadband access network of a telecommunications network comprising a central office point of delivery and/or for handling increased load situations and/or for performing specific tasks within the telecommunications network and/or within the central office point of delivery, wherein the central office point of delivery has or realizes a plurality of access nodes that terminate physical subscriber lines serving end users of the telecommunications network, wherein the handling of increased load situations and/or the performance of specific tasks relate to carrier control plane functions performed or to be performed by the central office point of delivery, wherein the central office point of delivery and/or the broadband access network comprises a plurality of compute nodes or servers being internally connected and providing an infrastructure to realize, on the one hand, a plurality of virtualized network functions and/or micro services, and, on the other hand, a message router and load balancing entity connecting these virtualized network functions and/or micro services, wherein the central office point of delivery is furthermore connected or connectable to additional compute nodes being able to provide an infrastructure to realize additional virtualized network functions and/or additional micro services and an additional message router and load balancing entity over a tunnel connection, wherein the central office point of delivery comprises a load management entity or functionality, wherein in order for operating the central office point of delivery and/or for handling increased load situations and/or for performing specific tasks within the telecommunications network and/or within the central office point of delivery, the central office point of delivery is configured such that:

the central office point of delivery and/or the load management entity or functionality thereof
        detects that an increased load situation is currently happening, or
        expects that an increased load situation is likely to happen or that a specific task is to be performed,
    the central office point of delivery triggers the use of the additional virtualized network functions and/or additional micro services and the additional message router and load balancing entity for handling the actual or expected increased load situation and/or for performing specific tasks within the telecommunications network and/or within the central office point of delivery,
    upon a detection of a normal load situation, the central office point of delivery releases the use of the additional virtualized network functions and/or additional micro services and the use of the additional message router and load balancing entity.

Still additionally, the present invention relates to a program comprising a computer readable program code which, when executed on a computer and/or on a network node of a central office point of delivery or on a load management entity or functionality, or in part on the network node of a central office point of delivery and/or in part on the load management entity or functionality, causes the computer and/or the network node of the central office point of delivery or the load management entity or functionality to perform an exemplary embodiment of the inventive method.

Furthermore, the present invention relates to a computer-readable medium comprising instructions which when executed on a computer and/or on a network node of a central office point of delivery or on a load management entity or functionality, or in part on the network node of a central office point of delivery and/or in part on the load management entity or functionality, causes the computer and/or the network node of the central office point of delivery or the load management entity or functionality to perform an exemplary embodiment of the inventive method.

These and other characteristics, features and advantages of the present invention will become apparent from the following detailed description, taken in conjunction with the accompanying drawings, which illustrate, by way of example, principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order; this is especially the case for the terms "first step", "second step", etc. It is to be understood that the terms so used are interchangeable under appropriate circumstances and that the embodiments of the invention described herein are capable of operation in other sequences than described or illustrated herein.

In FIG. 1, a telecommunications network 100 according to the present invention is schematically shown, having—preferably—at least a fixed line part. A mobile (or cellular) part may be present as well, as part of the telecommunications network 100, but is not specifically illustrated in FIG. 1. User equipment or client devices 51, 52 are connected to the telecommunications network 100 via a (broadband) access network 120. The telecommunications network 100 comprises, especially as part of the broadband access network 120, at least one logical or physical central office point of delivery 110 that is preferably realized within a (mini) data center and that is especially handling different access requirements, especially different access possibilities, of the client devices 51, 52 to network functionalities provided by the telecommunications network 100 or via the telecommunications network 100. The client devices 51, 52 are typically connected to the logical or physical central office point of delivery 110 via a customer premises equipment device 50, 50' or via a customer premises equipment functionality that may be built into or realized by the client devices 51, 52. Preferably but not necessarily, the central office point of delivery 110 comprises a switching fabric 115 comprising a plurality of spine network nodes and typically also a plurality of leaf network nodes which are not explicitly represented in FIG. 1.

Figure 2:
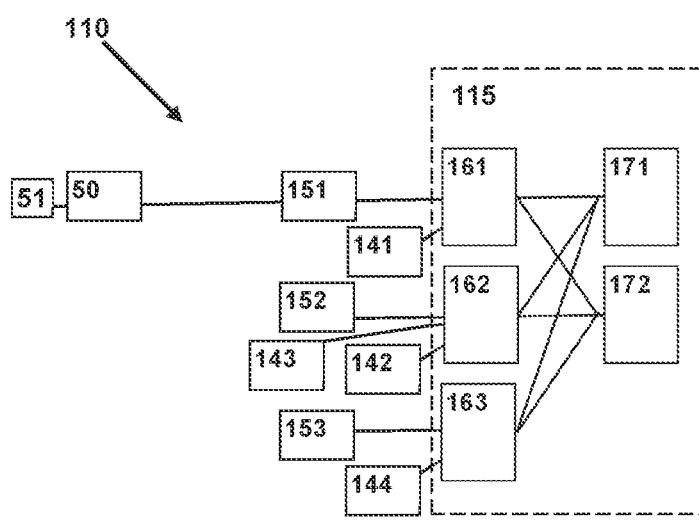
FIG. 2 schematically shows in greater detail the central office point of delivery comprising a certain number of components, entities and/or network nodes, especially a plurality of compute nodes or servers being internally connected and providing an infrastructure to realize, on the one hand, a plurality of virtualized network functions and/or micro services, and, on the other hand, a message router and load balancing entity connecting these virtualized network functions and/or micro services.

FIG. 2 schematically shows in greater detail the central office point of delivery 110 as part of the broadband access network 120 of a telecommunications network 100, the central office point of delivery 110 comprising a certain number of components, entities and/or network nodes, especially a plurality of compute nodes or servers 141, 142, 143, 144 being internally connected and providing an infrastructure to realize both a plurality of virtualized network functions and/or micro services, and a message router and load balancing entity connecting these virtualized network functions and/or micro services within the central office point of delivery 110. The represented part of the telecommunications network 100 comprises a switching fabric 115 comprising a plurality of spine network nodes 171, 172 and typically also a plurality of leaf network nodes 161, 162. Additionally, FIG. 2 shows a plurality of access nodes 151, 152, 153; examples of such access nodes 151, 152, 153 include line termination nodes, wherein, typically, each of the line termination nodes 151, 152 has one or a plurality of access node ports (not specifically illustrated in FIG. 2). The line termination nodes 151, 152, 153 or access nodes 151, 152, 153 may be provided to support different access technologies (e.g. DSL, digital subscriber line technologies, or line termination nodes supporting to be connected to an optical network, especially a passive optical network (PON), typically a so-called optical line terminal (OLT) or optical line terminal device) to a home gateway or customer premises equipment 50 and a user equipment 51. In such a situation, the client device 51 is connected to the telecommunications network 100 (i.e. to the respective access node of the plurality of access nodes 151, 152, 153) via the customer premises equipment 50 (or home gateway device 50), and, if applicable, a network termination node. The functionality of the customer premises equipment 50 (or home gateway device 50, cf. FIG. 1) and the functionality of the network termination node may also be integrated in one device or "box". Even the functionality of the client device 51, the functionality of the customer premises equipment 50 (or home gateway device 50) and the functionality of the network termination node may be integrated in one device or "box".

According to the present invention, the central office point of delivery 110 has or realizes a plurality of access nodes 151, 152, 153 that terminate physical subscriber lines serving end users (such as, e.g., the user equipment 51) of the telecommunications network 100. The processing done within the central office point of delivery 110 mainly relates to carrier control plane functions, hence, also the handling of increased load situations and/or the performance of specific tasks performed or to be performed by the central office point of delivery 110 relate to carrier control plane functions, i.e. typically not (or not primarily) the user plane traffic of the subscribers, or their user equipments, connected to the central office point of delivery 110. In FIG. 2, primarily the physical entities, components and/or network nodes of the central office point of delivery 110 are schematically shown.

Figure 3:
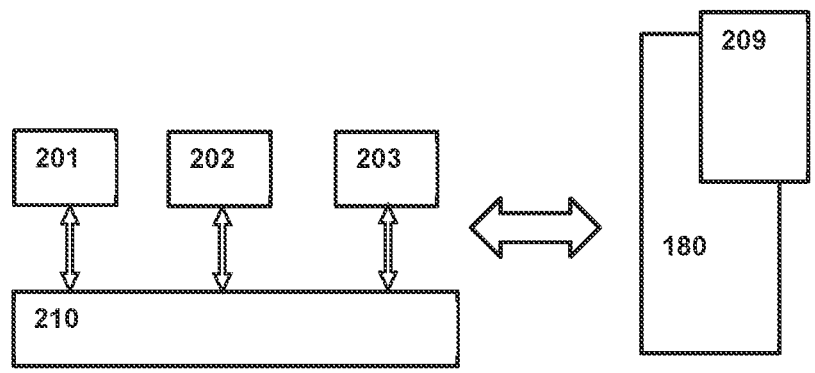
FIG. 3 schematically illustrates a block diagram comprising a plurality of virtualized network functions and/or micro services, and a message router and load balancing entity connecting these virtualized network functions and/or micro services within a central office point of delivery according to the present invention.

In FIG. 3 a block diagram showing primarily the virtualized layer and its parts or components of the central office point of delivery 110 is schematically shown. The central office point of delivery 110 comprises (i.e. the physical hardware within the central office point of delivery 110 is able to instantiate) a plurality of virtualized network functions and/or micro services 201, 202, 203, and a message router and load balancing entity 210, connecting these virtualized network functions and/or micro services 201, 202, 203, i.e. the compute nodes or servers 141, 142 are internally (i.e. within the central office point of delivery 110) connected and provide an infrastructure to realize the virtualized network functions and/or micro services 201, 202, 203, and the message router and load balancing entity 210.

Figure 5:
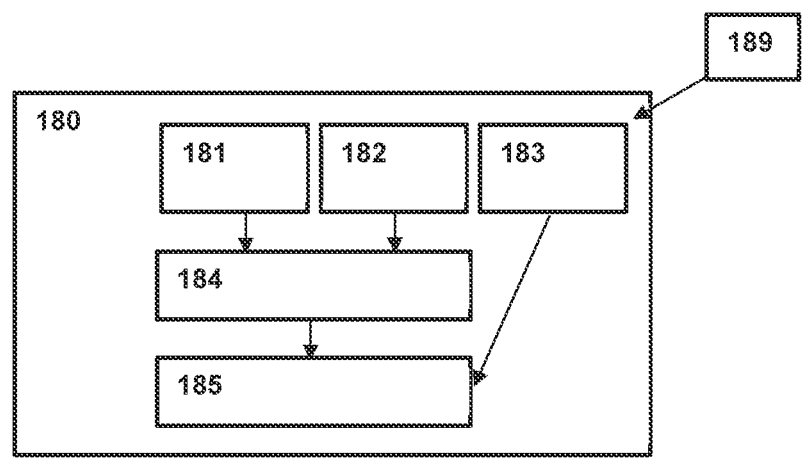
FIG. 5 schematically illustrates a load management entity or functionality and its building blocks and/or components.

In addition to the virtualized network functions and/or micro services 201, 202, 203, and the (likewise virtualized) message router and load balancing entity 210, the central office point of delivery 110 also comprises or realizes (or instantiates) a micro services management system 209, and comprises a load management entity or functionality 180. Via the micro services management system 209, it is advantageously possible to execute management decisions and/or to comply with policies or rules regarding the virtualized network functions and/or micro services 201, 202, 203. In FIG. 5, the load management entity or functionality 180 and its building blocks and/or components is schematically illustrated. Preferably according to the present invention, the load management entity or functionality 180 comprises a load detection function or functionality 181, a rules and/or policies function or database or repository 182, an external management interface 183, a decision logic 184, and an offload execution engine 185. Via the external management interface 183, it is advantageously possible according to the present invention that an operator 189 is able to generally trigger an offload or is able to trigger that either specified micro services or that specified micro service instances or processing capacities are offload (i.e. from the central office point of delivery 110 to the external processing resources). In such a case, the offload execution engine 185 is directly triggered which is schematically represented by an arrow from the external management interface 183 to the offload execution engine 185. Both signals produced or generated by the load detection function or functionality 181 and content of the rules and/or policies function or database or repository 182 are provided to the decision logic 184 (schematically represented, in FIG. 5, by respective arrows), and resulting decisions are provided to the offload execution engine 185 (also schematically represented, in FIG. 5, by an arrow).

As already said, the processing done within the central office point of delivery 110 mainly relates to carrier control plane functions, i.e. typically not (or not primarily) the user plane traffic of the subscribers, or their user equipments, connected to the central office point of delivery 110. Hence, the virtualized network functions and/or micro services 201, 202, 203 exclusively or mainly relate or process control plane tasks or signalization tasks related the central office point of delivery 110 and/or to the user equipments connected thereto.

Figure 4:
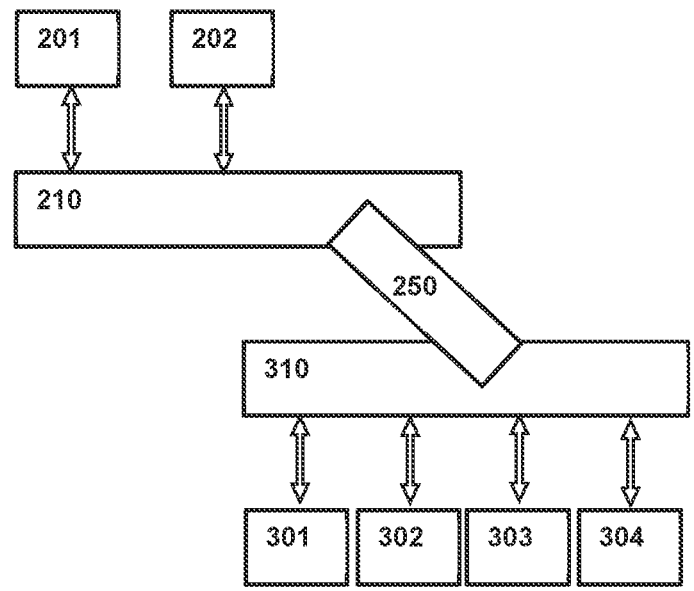
FIG. 4 schematically illustrates a further block diagram comprising likewise a plurality of virtualized network functions and/or micro services, together with a message router and load balancing entity within a central office point of delivery according to the present invention, being connected to additional virtualized network functions and/or micro services, and additional virtualized network functions and/or additional micro services and an additional message router and load balancing entity over a tunnel connection.

In FIG. 4, a further block diagram is schematically shown relating to the virtualized network functions and/or micro services 201, 202, 203 (as well as the message router and load balancing entity 210) realized (or instantiated) as part of the central office point of delivery 110, i.e. locally with respect to the central office point of delivery 110, as well as additional virtualized network functions and/or additional micro services 301, 302, 303 (together with an additional message router and load balancing entity 310), being realized (or instantiated) as part of a hardware infrastructure external to the considered central office point of delivery 110. The hardware infrastructure providing (realizing or instantiating) both the additional virtualized network functions and/or additional micro services 301, 302, 303, and the additional message router and load balancing entity 310 may either be another central office point of delivery (e.g. a more or less neighboring central office point of delivery) and/or a central or centralized hardware component or data center, either as part of the telecommunications network 100 or external to the telecommunications network 100 (but, of course, accessible by the telecommunications network 100). According to the present invention, the processing capacity (especially in terms of being able to provide virtualized network functions and/or micro services 201, 202, 203 (especially of sufficient sorts and numbers and/or having sufficient processing capacity) and/or message router and load balancing entity 210) the hardware components of the central office point of delivery 110 and its processing power is (especially temporarily) enhanced via the external hardware infrastructure providing the additional virtualized network functions and/or micro services 301, 302, 303 and the additional message router and load balancing entity 310. The additional virtualized network functions and/or micro services 301, 302, 303 and the additional message router and load balancing entity 310 are linked (or made available to the resources within the considered central office point of delivery 110) via using a tunnel connection 250, especially a virtual private network tunnel connection 250.

According to the present invention, the central office point of delivery 110 comprises a load management entity or functionality 180, especially for detecting the need to ask for or to request additional virtualized network functions and/or micro services 301, 302, 303 (at instances within the telecommunications network 100 external to the central office point of delivery 110). According to the present invention, it is advantageously possible that such decisions to enhance the locally available processing capacity (of the virtualized network functions and/or micro services 201, 202, 203) are especially able to be taken prior to an acute situation of increased load and/or prior to performing specific tasks within the central office point of delivery 110 and/or within the telecommunications network 100. Hence, in a first step according to the present invention, the central office point of delivery 110 and/or the load management entity or functionality 180 thereof either detects that an increased load situation is currently happening, or expects that an increased load situation is likely to happen or that a specific task is to be performed. In a second step, the central office point of delivery 110 (especially the load management entity or functionality 180) triggers the use of the additional virtualized network functions and/or additional micro services 301, 302, 303 and the additional message router and load balancing entity 310 (provided by external hardware) for handling the actual or expected increased load situation and/or for performing specific tasks within the telecommunications network 100 and/or within the central office point of delivery 110. After the increased load situation is over or after the specific tasks are executed within the central office point of delivery 110 and/or within the telecommunications network 100, i.e. upon a detection of a normal load situation, the central office point of delivery 110 releases, in a third step, the use of the additional virtualized network functions and/or additional micro services 301, 302, 303 and the use of the additional message router and load balancing entity 310.

It is thereby advantageously possible according to the present invention that the processing capacities within a considered central office point of delivery 110 are able to be—especially temporarily—enhanced such that a specific situation of high load (such as, e.g., during a (partial) boot operation within the central office point of delivery 110) and/or specific tasks to be performed within the telecommunications network 100 and/or within the central office point of delivery 110 are able to be handled efficiently and especially without leading to a reduced service level or quality-of-service noticeable to the subscribers of the telecommunications network 100. Due to economic reasons, the number of servers 141, 142, 143, 144 or network nodes (or, more generally, processing capacities) inside a central office point of delivery 110 is limited—also due to the need and the desire to implement an energy-efficient system design. During normal operation of the central office point of delivery 110, compute power in the different central office points of delivery within the telecommunications network 100 is typically not an issue; servers will not be under (heavy) load, as—especially in order to keep, e.g., the time limit for the system reboot reasonably low—the local hardware capacity setup (within each central office point of delivery 110) is typically over-dimensioned.

According to the present invention, especially the load management entity or functionality 180 within the central office point of delivery 110 detects that an increased load situation is currently happening, or expects that an increased load situation is likely to happen or that a specific task is to be performed. Hence, according to the present invention, it is a domain-related knowledge that typically triggers the additional virtualized network functions and/or micro services 301, 302, 303 and the additional message router and load balancing entity 310 to be able to be used by the considered central office point of delivery 110 (and, according to the present invention, it is no service-agnostic system that is only able to react to current load conditions and to outsource compute power completely to a central site without any local hosting of the respective services; hence, according to the present invention and in contrary to such service-agnostic systems, a full dependency of the local system on the availability of the central resources is able to be avoided).

Hence, according to the present invention, it is advantageously possible to offload compute storage power from the central office point of delivery 110 to a further system (either a neighboring central office point of delivery or a centralized cloud system, or a combination thereof) to drive down, e.g., the restart time in case that many user sessions need to be set up at the same time. According to the present invention a "cloud burst" mechanism is added to the central office point of delivery 110 (i.e. the additional virtualized network functions and/or micro services 301, 302, 303 are temporarily made available to the central office point of delivery 110 and its resources (virtualized network functions and/or micro services 201, 202, 203).

According to the present invention, the central office point of delivery 110 of a telecommunications network 100 is able to use the additional virtualized network functions and/or micro services 301, 302, 303; the load management entity or functionality 180 typically

- detects the need to extend (offload or boost) local resource capacity (based on e.g. load of local services or scheduling of a system maintenance),
- identifies and reserves external resources, and
- extends the cloud cluster and load balancing; advantageously this could be done, e.g., via Kubernetes and components included;
- throttles the control and management plane of the central office point of delivery 110 to ensure stable operation until the additional resources (i.e. the additional virtualized network functions and/or micro services 301, 302, 303) are available and connected;
- extends the capacity (offload or boost) for specific micro services;
- detects completion
- moves full operation back into the central office point of delivery 110 and releases the remote resources (i.e. the additional virtualized network functions and/or micro services 301, 302, 303), and
- emergency stops (and reboots) locally in case of failure/problems.

Inside the central office point of delivery 110, a plurality (or a multitude) of multiple micro services (or virtualized network functions and/or micro services 201, 202, 203) are running. Only a first type 201, a second type 202, and a third type 203 of micro service is schematically shown in FIG. 3; however, each type of micro service 201, 202, 203 may have multiple instances.

The message router (or message router and load balancing entity 210), e.g. a load balancer for HTTP(S) requests (hypertext transfer protocol (secure)) or a message bus serves to route messages between the micro services 201, 202, 203; hence, messages always traverse via the message router and load balancing entity 210 of the central office point of delivery 110.

According to the present invention, the central office point of delivery 110 is connected to an external data center (or another central office point of delivery) via a tunnel 250 and connects the message router and load balancing entity 210 in the central office point of delivery 110 to the message router and load balancing entity 310 in the external data center (or other central office point of delivery). This means that services such as specific micro services (e.g. the third micro service 203) are able to "move" into (or are able to be processed by) the external resource or cloud, and with the help of adapting the configurations of the message router and load balancing entity 210, it looks to other services (e.g. to the first micro service 201, and to the second micro service 202) as if the third micro service 203 (and, if applicable, its clones or further instances) was/were still available locally, i.e. within the central office point of delivery 110.

In case the third micro service 203 has been the determining factor for the overall performance of the system, via offloading and cloning this third micro service 203 (and providing its functionality via the additional virtualized network functions and/or micro services 301, 302, 303) it is advantageously possible according to the present invention to achieve a much higher processing rate for the overall system of the central office point of delivery 110.

Different use cases for such an offloading are able to be implemented, however, at least the two following cases are mentioned: a full reboot operation of the central office point of delivery 110 and a (partial) reboot operation thereof (i.e. a reboot operation of at least some components). Both operations result in a storm of network attachment requests and high load on the control plane servers and the need for offloading. A full reboot process could be implemented as follows:

In a first processing step of such a boot up of hardware and software components of the central office point of delivery 110, the gates towards customers are closed or limited to acceptable rates; in a second processing step, a virtual private network connection is established to external resources, e.g. a cloud resource, and resources thereof are reserved for the micro services needed; if no external resources are available, the central office point of delivery is booted anyway and connected to customers without external resources, i.e. with only using local micro services; however, in case external resources are available, in a third processing step service instances (i.e. virtualized network functions and/or micro services 201, 202, 203) are cloned and data (especially state data if applicable) is moved as well as both message router and load balancing entities 210, 310 adapted. In a fourth processing step, the gates to the customer side are opened, and requests are processed using both local resources (i.e. virtualized network functions and/or micro services 201, 202, 203) as well as external resources, or cloud-based micro services (i.e. additional virtualized network functions and/or micro services 301, 302, 303). In a fifth processing step, it is detected that the current state is stable and that all or almost all user sessions are up. In a sixth processing step, the gates of the message routers and load balancing entities 210, 310 are closed, furthermore, the service instances are cloned into the central office point of delivery 110, the data (especially state data) are moved to the central office point of delivery 110, both message routers and load balancing entities 210, 310 are adapted, and the local message router and load balancing entity 210 is re-opened. Finally, this leads again to a stable operation of the central office point of delivery 110.

According to the present invention, a full offload of a type of service (or all micro services) may be differentiated from a burst operation where instances of the same microservice may reside inside and outside the central office point of delivery 110 (i.e. as part of the virtualized network functions and/or micro services 201, 202, 203 and as part of the additional virtualized network functions and/or micro services 301, 302, 303).

According to the present invention, other use cases that require offloading of computing power in the central office point of delivery 110 include:

a scheduled update of all running sessions in the central office point of delivery 110 that requires a lot of internal signaling load;

running a "local" data processing task in the control plane such as e.g. a debug mode; an additional module may be put into the signaling path and does, e.g., anomaly detection. In case the resource required for running those modules goes beyond to what the central office point of delivery 110 is able to provide, it is advantageously possible according to the present invention to offload this module or the whole control plane to external resources. Thereby, it is possible and preferred according to the present invention to run the control plane fully outside of the central office point of delivery 110 where there are, e.g., much better tools to debug.

It is furthermore possible according to the present invention to have a data center with extended debugging and/or telemetry tools; such a data center would receive the full control plane micro services and execute them while being fully observed by tools that could not be run in the restricted environment of a central office point of delivery 110.

Other use case for offloading processing power to instances or hardware resources outside of the central office point of delivery 110 include the following:

scheduled maintenance of the local servers or the local Kubernetes cluster;

maintenance takeover of local server resources.

According to a specific embodiment of the present invention, the micro services 201, 202, 203 are all managed by Kubernetes. The k8s cluster may be either expanded from within the central office point of delivery 110 to the cloud offload data center or stitched to an existing one.

Especially according to the present invention, an adapted load balancing and communication between the central office point of delivery 110 and the external resources is provided with especially the central office point of delivery 110 is detecting the need to add external resources and triggering the offloading process (e.g. by shutting down interfaces to ingress events for a short time).

Detecting the need can be done by k8s only by checking the server load or other metrics that is not application-specific. According to the present invention, this can also be done based on following criteria:

Scheduled reboot or turn-on of debugging mode;

Early detection of a signaling storm at the entry to the control plane signaling system (e.g. via detecting a huge amount of attachment requests, close gate, scale out, open gate)

Detection of a bogus component that causes many message but shall be handled and investigated into by offloading the workload on thus being able to handle the requests Detection by other criteria that can be learnt, e.g. via signature detection/artificial intelligence (an example could be misbehaving devices that cause a signaling storm or OLTs (optical line terminals) going out of service comparatively soon identifying the target data center can include a reservation process by request and response.

Hence, according to the present invention, an architecture is provided for distributed resource management and control for micro services running in a mini-data center-like central office point of delivery 110 and serving broadband network access control and management plane functions with a focus on dynamically scaling out and in the services to/from external data centers. It is especially preferred to identify, verify and reserve suitable remote (i.e. external to the central office point of delivery 110) data center resources. Furthermore, it is preferred to provide a mechanism to manage (e.g. by throttling/closing gates) the load on local services of the central office point of delivery 110, to ensure a stable operation, until additional remote cloud resources become available. Furthermore, it is preferred to provide a method to set up/tear down the network connection from the central office point of delivery 110 to remote cloud helper data center sites, and a method to verify the performance of network connections from the central office point of delivery 110 to remote cloud helper data center sites. The invention furthermore involves a method to temporarily bind and release remote data center resources for the execution of a selected set of micro services, running in a mini-data center-like central office point of delivery 110 and serving broadband network access control and management plane functions, to boost performance, either to burst or to fully offload all services or a selected subset of types.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for handling increased load situations and/or for performing specific tasks within a telecommunications network, comprising:

in a first step, determining, by at least one compute node or server of a central office point of delivery of a broadband access network of the telecommunications network, that an increased load situation is currently happening or that an increased load situation is likely to happen or that a specific task is to be performed, wherein determining that an increased load situation is currently happening or is likely to happen or that a specific task is to be performed is based on an amount of network attachment requests, a misbehaving device causing a signaling storm, or optical line terminals going out of service, wherein handling of increased load situations and/or performance of specific tasks relate to carrier control plane functions performed or to be performed by the central office point of delivery, and wherein the central office point of delivery comprises a plurality of compute nodes or servers providing an infrastructure to realize, on the one hand, a plurality of virtualized network functions and/or micro services, and, on the other hand, a message router and load balancing entity connecting the plurality of virtualized network functions and/or micro services, wherein the message router and load balancing entity routes messages between the virtualized network functions and/or micro services;

in a second step, triggering, by the at least one compute node or server of the central office point of delivery, use of additional virtualized network functions and/or additional micro services and an additional message router and load balancing entity for handling the increased load situation and/or for performing specific tasks within the telecommunications network, wherein the additional virtualized network functions and/or additional micro services and the additional message router and load balancing entity are realized via additional compute nodes or servers of a hardware infrastructure external to the central office point of delivery that are connected to the central office point of delivery, wherein the additional virtualized network functions and/or additional micro services include at least one of the virtualized network functions and/or micro services of the central office point of delivery being cloned on the additional compute nodes or servers of the external hardware infrastructure, wherein the additional message router and load balancing entity routes messages between the additional virtualized network functions and/or additional micro services, and wherein the message router and load balancing entity is connected to the additional message router and load balancing entity via a tunnel connection, wherein messages between the virtualized network functions and/or micro services of the central office point of delivery and the at least one cloned virtualized network function and/or micro service of the external hardware infrastructure are routed via the tunnel connection between the message router and load balancing entity of the central office point of delivery and the additional message router and load balancing entity of the external hardware infrastructure; and in a third step, upon detection of a normal load situation, releasing, by the at least one compute node or server of the central office point of delivery, the use of the additional virtualized network functions and/or additional micro services and the use of the additional message router and load balancing entity.

2. The method according to claim 1, wherein the second step comprises:
   the load management entity or functionality of the central office point of delivery identifying and reserving and/or requesting the additional virtualized network functions and/or additional micro services and the additional message router and load balancing entity; and
   the load management entity or functionality using the additional virtualized network functions and/or additional micro services and/or the additional message router and load balancing entity via either:
      extending the available plurality of virtualized network functions and/or micro services by the additional virtualized network functions and/or additional micro services and/or extending the message router and load balancing entity by the additional message router and load balancing entity; or
      relocalizing the plurality of virtualized network functions and/or micro services to the additional virtualized network functions and/or additional micro services; and
   wherein the third step comprises: the load management entity or functionality detecting the increased load situation to be over and/or detecting the completion of the specific task, and releasing the use of the additional virtualized network functions and/or the additional micro services and of the additional message router and load balancing entity for the purposes of the central office point of delivery.

3. The method according to claim 1, wherein the central office point of delivery comprises a micro services management system to measure the load of the virtualized network functions and/or micro services in real-time.

4. The method according to claim 1, wherein the broadband access network comprises a switching fabric, the switching fabric comprising a plurality of spine network nodes and a plurality of leaf network nodes; and/or
   wherein the broadband access network comprises a plurality of line termination nodes, wherein each one of the plurality of line termination nodes is connected to at least two leaf network nodes of the plurality of leaf network nodes.

5. The method according to claim 1, wherein increased load situations and/or performing specific tasks within the telecommunications network include one or a plurality of the following:
   complete reboot of the central office point of delivery;
   a reboot of a line termination node and/or a reboot of a leaf network node;
   scheduled maintenance of compute nodes or servers of the central office point of delivery;
   a scheduled update of at least a majority of user sessions currently running within the central office point of delivery;
   running a debugging mode in a control plane of the central office point of delivery; or
   relocalizing the control plane of the central office point of delivery to realize the functionality of the central office point of delivery by the additional virtualized network functions and/or additional micro services and/or by the additional message router and load balancing entity.

6. The method according to claim 1, wherein the second step further comprises:
   throttling a control and management plane of the central office point of delivery until the additional virtualized network functions and/or micro services are available and connected to the central office point of delivery.

7. A system for handling increased load situations and/or for performing specific tasks within a telecommunications network and/or within the central office point of delivery, comprising:
   a broadband access network of the telecommunications network, wherein the broadband access network comprises a central office point of delivery, and wherein the central office point of delivery comprises a plurality of compute nodes or servers providing an infrastructure to realize, on the one hand, a plurality of virtualized network functions and/or micro services, and, on the other hand, a message router and load balancing entity connecting the plurality of virtualized network functions and/or micro services, wherein the message router and load balancing entity routes messages between the virtualized network functions and/or micro services; and
   additional compute nodes or servers of a hardware infrastructure external to the central office point of delivery that are connected to the central office point of delivery to realize additional virtualized network functions and/or additional micro services and the additional message router and load balancing entity, wherein the additional message router and load balancing entity routes messages between the additional virtualized network functions and/or additional micro services, and wherein the message router and load balancing entity is connected to the additional message router and load balancing entity via a tunnel connection;
   wherein at least one compute node or server of the central office point of delivery of the broadband access network is configured to:
      in a first step, determine that an increased load situation is currently happening or that an increased load situation is likely to happen or that a specific task is to be performed, wherein determining that an increased load situation is currently happening or is likely to happen or that a specific task is to be performed is based on an amount of network attachment requests, close gate, scale out, open gate, a misbehaving device causing a signaling storm, or optical line terminals going out of service, wherein handling of increased load situations and/or performance of specific tasks relate to carrier control plane functions performed or to be performed by the central office point of delivery;
      in a second step, trigger use of the additional virtualized network functions and/or additional micro services and the additional message router and load balancing entity for handling the increased load situation and/or for performing specific tasks within the telecommunications network, wherein the additional virtualized network functions and/or additional micro services include at least one of the virtualized network functions and/or micro services of the central office point of delivery being cloned on the additional compute nodes or servers of the external hardware infrastructure, and wherein messages between the virtualized network functions and/or micro services of the central office point of delivery and the at least one cloned virtualized network function and/or micro service of the external hardware infrastructure are routed via the tunnel connection between the message router and load balancing entity of the central office point of delivery and the additional message router and load balancing entity of the external hardware infrastructure; and in a third step, upon detection of a normal load situation, release the use of the additional virtualized network functions and/or additional micro services and the use of the additional message router and load balancing entity;

wherein a load management entity or functionality of the central office point of delivery is configured to:

trigger an emergency stop of a part of a plurality of virtualized network functions and/or micro services, the emergency stop involving shutting down a part of the plurality of compute nodes or servers of the central office point of delivery; and trigger a local reboot of the part of the plurality of compute nodes or servers of the central office point of delivery;

wherein the additional virtualized network functions and/or additional micro services and the additional message router and load balancing entity are used while the part of the plurality of compute nodes or servers of the central office point of delivery are shut down and being rebooted.

8. A non-transitory computer-readable medium having processor-executable instructions stored thereon for handling increased load situations and/or for performing specific tasks within a telecommunications network wherein the processor-executable instructions, when executed by at least one compute node or server of a central office point of delivery of a broadband access network of the telecommunications network, facilitate performance of the following steps by the at least one compute node or server of the central office point of delivery:

in a first step, determining that an increased load situation is currently happening or that an increased load situation is likely to happen or that a specific task is to be performed, wherein determining that an increased load situation is currently happening or is likely to happen or that a specific task is to be performed is based on an amount of network attachment requests, a misbehaving device causing a signaling storm, or optical line terminals going out of service, wherein handling of increased load situations and/or performance of specific tasks relate to carrier control plane functions performed or to be performed by the central office point of delivery, and wherein the central office point of delivery comprises a plurality of compute nodes or servers providing an infrastructure to realize, on the one hand, a plurality of virtualized network functions and/or micro services, and, on the other hand, a message router and load balancing entity connecting the plurality of virtualized network functions and/or micro services, wherein the message router and load balancing entity routes messages between the virtualized network functions and/or micro services;

in a second step, triggering use of additional virtualized network functions and/or additional micro services and an additional message router and load balancing entity for handling the increased load situation and/or for performing specific tasks within the telecommunications network, wherein the additional virtualized network functions and/or additional micro services and the additional message router and load balancing entity are realized via additional compute nodes or servers of a hardware infrastructure external to the central office point of delivery that are connected to the central office point of delivery, wherein the additional virtualized network functions and/or additional micro services include at least one of the virtualized network functions and/or micro services of the central office point of delivery being cloned on the additional compute nodes or servers of the external hardware infrastructure, wherein the additional message router and load balancing entity routes messages between the additional virtualized network functions and/or additional micro services, and wherein the message router and load balancing entity is connected to the additional message router and load balancing entity via a tunnel connection, wherein messages between the virtualized network functions and/or micro services of the central office point of delivery and the at least one cloned virtualized network function and/or micro service of the external hardware infrastructure are routed via the tunnel connection between the message router and load balancing entity of the central office point of delivery and the additional message router and load balancing entity of the external hardware infrastructure; and in a third step, upon detection of a normal load situation, releasing the use of the additional virtualized network functions and/or additional micro services and the use of the additional message router and load balancing entity;

wherein the processor-executable instructions, when executed via a load management entity or functionality of the central office point of delivery, facilitate performance of the following steps by the central office point of delivery:

triggering an emergency stop of a part of a plurality of virtualized network functions and/or micro services, the emergency stop involving shutting down a part of the plurality of compute nodes or servers of the central office point of delivery; and triggering a local reboot of the part of the plurality of compute nodes or servers of the central office point of delivery;

wherein the additional virtualized network functions and/or additional micro services and the additional message router and load balancing entity are used while the part of the plurality of compute nodes or servers of the central office point of delivery are shut down and being rebooted.

* * * * *